United States Patent
Alicherry et al.

(10) Patent No.: US 9,934,059 B2
(45) Date of Patent: Apr. 3, 2018

(54) FLOW MIGRATION BETWEEN VIRTUAL NETWORK APPLIANCES IN A CLOUD COMPUTING NETWORK

(71) Applicant: Alcatel Lucent, Boulogne-Billancourt (FR)

(72) Inventors: Mansoor Alicherry, Bangalore (IN); Ashok Anand, Bangalore (IN); Shoban Preeth Chandrabose, Bangalore (IN)

(73) Assignee: WSOU Investments, LLC, Los Angeles, CA (US)

( * ) Notice: Subject to any disclaimer, the term of this patent is extended or adjusted under 35 U.S.C. 154(b) by 0 days.

(21) Appl. No.: 14/783,109

(22) PCT Filed: Mar. 27, 2014

(86) PCT No.: PCT/EP2014/000851
§ 371 (c)(1),
(2) Date: Oct. 8, 2015

(87) PCT Pub. No.: WO2014/166603
PCT Pub. Date: Oct. 16, 2014

(65) Prior Publication Data
US 2016/0048407 A1  Feb. 18, 2016

(30) Foreign Application Priority Data
Apr. 12, 2013  (IN) .......................... 1109/DEL/2013

(51) Int. Cl.
*G06F 9/455*  (2006.01)
*H04L 12/24*  (2006.01)
(Continued)

(52) U.S. Cl.
CPC ...... *G06F 9/45558* (2013.01); *H04L 41/5096* (2013.01); *H04L 43/08* (2013.01);
(Continued)

(58) Field of Classification Search
None
See application file for complete search history.

(56) References Cited

U.S. PATENT DOCUMENTS

2009/0106571 A1  4/2009  Low et al.
2011/0255675 A1*  10/2011  Jasper ................ H04M 3/5237
                                                          379/112.1
(Continued)

FOREIGN PATENT DOCUMENTS

EP      2665228 A2    11/2013
WO   WO-2011100900 A2  8/2011

OTHER PUBLICATIONS

International Search Report PCT/ISA/210 for International Application No. PCT/EP2014/000851 dated Jul. 4, 2014.
(Continued)

*Primary Examiner* — Sisley Kim
(74) *Attorney, Agent, or Firm* — Sean D. Burdick

(57) ABSTRACT

Methods and systems for flow migration between virtual network appliances in a cloud computing network are described. A network appliances managing architecture for migrating flow between VNAs including a controller to receive performance data for a VNA and analyze the performance data to determine whether the VNA has a weak performance status, where the weak performance status corresponds to any one of an overloaded, an under-loaded, and a failed status. The network appliances managing architecture further includes a classifier to receive a flow migration request from the controller for migrating one or more flows of data packets from the VNA based on the analyzing. The classifier further identifies an active VNA for flow migration based on a mapping policy and migrates the one or more flows from the VNA to the at least one active VNA.

15 Claims, 3 Drawing Sheets

(51) Int. Cl.
*H04L 12/26* (2006.01)
*G06F 9/50* (2006.01)

(52) U.S. Cl.
CPC .... *G06F 9/5083* (2013.01); *G06F 2009/4557* (2013.01); *G06F 2009/45591* (2013.01); *G06F 2009/45595* (2013.01); *G06F 2209/5022* (2013.01)

(56) References Cited

U.S. PATENT DOCUMENTS

| | | | |
|---|---|---|---|
| 2011/0277027 A1* | 11/2011 | Hayton | H04L 63/0815 726/8 |
| 2013/0067469 A1 | 3/2013 | Das et al. | |
| 2014/0146673 A1* | 5/2014 | Parker | H04L 47/10 370/235 |

OTHER PUBLICATIONS

Written Opinion of the International Searching Authority PCT/ISA/237 for International Application No. PCT/EP2014/000851 dated Jul. 4, 2014.

* cited by examiner

FLOW MIGRATION BETWEEN VIRTUAL NETWORK APPLIANCES IN A CLOUD COMPUTING NETWORK

CROSS-REFERENCE TO RELATED APPLICATIONS

This application is a national phase under 35 U.S.C. §371 of PCT International Application No. PCT/EP2014/000851 which has an International filing date of Mar. 27, 2014, which claims priority to India Application No. INSN 1109/DEL/2013, filed Apr. 12, 2013, the entire contents of each of which are hereby incorporated by reference.

FIELD OF INVENTION

The present subject matter relates to cloud computing networks and, particularly but not exclusively, to managing flow migration between virtual network appliances in the cloud computing network.

BACKGROUND

Cloud computing networks have reshaped the field of Internet-provided services due to its beneficial nature for individual users as well as large enterprises. The cloud computing networks utilize virtual machines (VMs) for providing various services, such as firewalls, data storage, and intrusion detection to users. The VM may be understood as a portion of software that, when executed, allows virtualization of an actual physical computing system. Each VM may function as a self-contained platform, running its own operating system and software applications. Cloud computing customers are thus able to access various services and applications without actually purchasing physical resources utilized for the services.

SUMMARY

This summary is provided to introduce concepts related to systems and methods for flow migration between virtual network appliances in a cloud computing network. This summary is neither intended to identify essential features of the claimed subject matter nor is it intended for use in determining or limiting the scope of the claimed subject matter.

In one implementation, a network appliances managing architecture for migrating flow between virtual network appliances (VNA) is described. The network appliances managing architecture comprises a controller to receive performance data for a VNA and analyze the performance data to determine whether the VNA has a weak performance status. The weak performance status corresponds to any one of an overloaded, an under-loaded, and a failed status. The network appliances managing architecture further comprises a classifier to receive a flow migration request from the controller for migrating one or more flows of data packets from the VNA based on the analyzing. The classifier further identifies an active VNA for flow migration based on a predetermined mapping policy and migrates the one or more flows from the VNA to the at least one active VNA.

In another implementation, a method for flow migration in a cloud computing network is described. The method includes receiving performance data for a VNA. The method further comprises analyzing the performance data to determine whether the VNA has a weak performance status, where the weak performance status corresponds to any one of an overloaded, an under-loaded, and a failed status. Further, a flow migration request is provided to a classifier for migrating one or more flows of data packets from the VNA based on the analyzing. Further at least one active VNA is identified for flow migration based on a predetermined mapping policy. The method further comprises migrating the one or more flows from the VNA to the at least one active VNA.

In yet another implementation, a method for managing virtual network appliances (VNAs) is described. The method for managing the VNAs comprises ascertaining total load handled by a plurality of VNAs operating in a cloud computing network. Further, the total load is compared with a minimum threshold level and a maximum threshold level. The method further comprises determining whether to perform at least one of a scaling up or scaling down of the plurality of VNAs based on the comparing. Further, at least one VNA is identified from among the plurality of VNAs for flow migration based on the determination. The method further comprises providing a flow migration request to a classifier for migrating one or more flows of data packets from the at least one VNA based on the identifying. The method further comprises migrating the one or more flows from the at least one VNA to at least one active VNA based on a predetermined mapping policy.

In yet another implementation, a computer-readable medium having embodied thereon a computer program for executing a method of flow migration between virtual network appliances (VNAs) in a cloud computing network is described. The method comprises receiving performance data for a VNA. The method further comprises analyzing the performance data to determine whether the VNA has a weak performance status, where the weak performance status corresponds to any one of an overloaded, an under-loaded, and a failed status. Further, a flow migration request is provided to a classifier for migrating one or more flows of data packets from the VNA based on the analyzing. Further at least one active VNA is identified for flow migration based on a predetermined mapping policy. The method further comprises migrating the one or more flows from the VNA to the at least one active VNA.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system or methods in accordance with embodiments of the present subject matter are now described, by way of example only, and with reference to the accompanying figures, in which.

Figure 1:
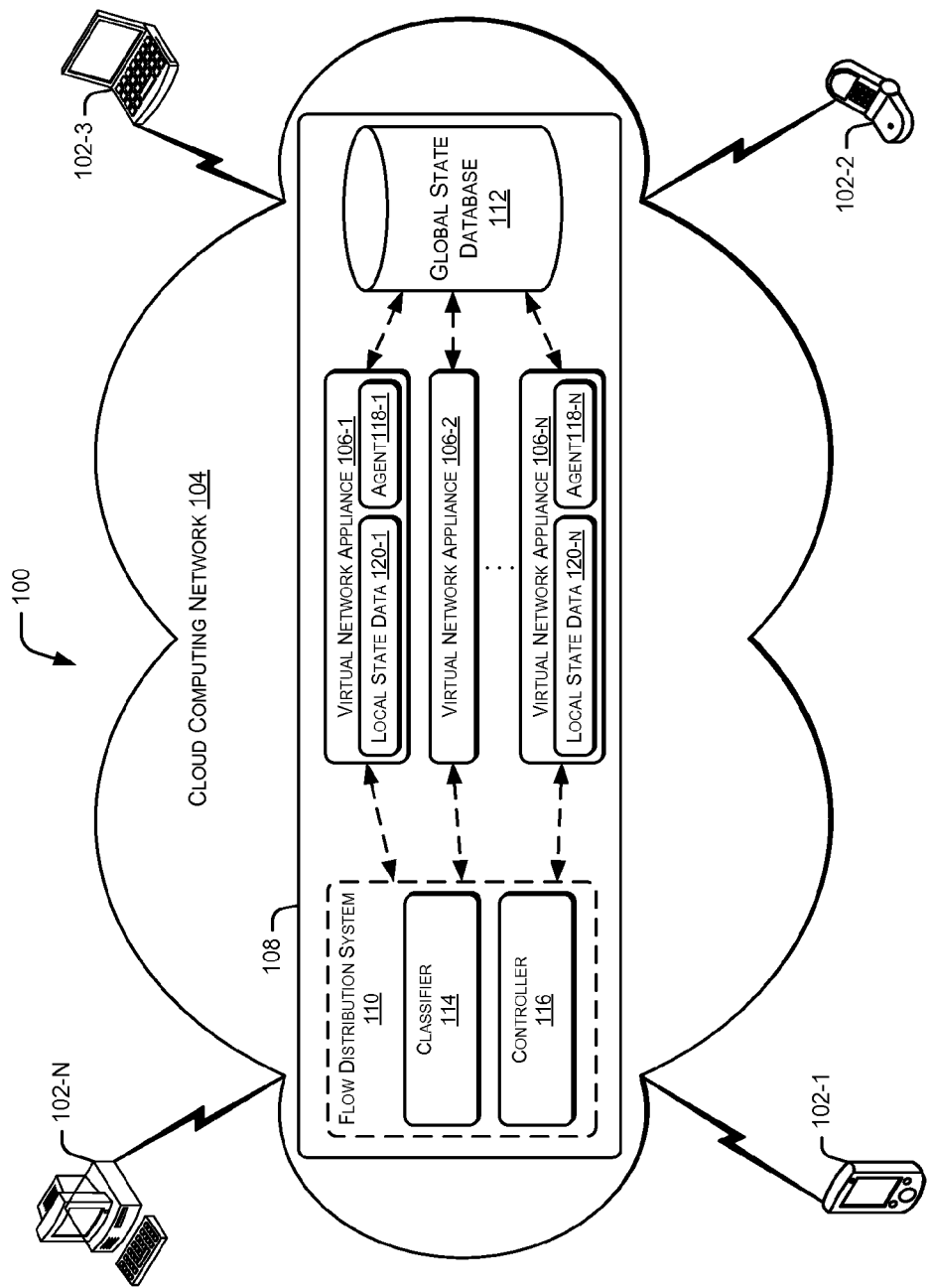
FIG. 1 illustrates a cloud computing environment, according to an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like, represent various processes which may be substantially represented in computer readable medium and so executed by a computer or processor, whether or not such computer or processor is explicitly shown.

DESCRIPTION OF EMBODIMENTS

Systems and methods for flow migration between virtual network appliances in a cloud computing network are described. Cloud computing is a conventionally known technique of providing services to users by way of creating virtual environment of computing resources. The cloud computing network involves hardware and software resources, accessible through Virtual Machines (VM), hosted on either the Internet or a private network to form a virtual environment for providing various services, such as firewalls, data storage, WAN optimization, and intrusion detection. The VMs, as will be understood, are computing machines with a software that when executed create a replica of a physical machine for providing same services that are provided by the physical machine but in a virtual environment. Thus, VMs are typically used to virtualize computing machines and network appliances, such as end user applications, firewalls, data storage devices, WAN optimizers, virtual private networks (VPNs), and intrusion detection system. The VMs function as independent machines running its own operating system, processors, and other software applications. Any user or subscriber may thus subscribe with the service provider who is providing a cloud computing network service and may interact with the VMs for using the service.

Typically, the service providers create one or more virtual network appliances (VNAs) corresponding to the physical network appliances in order to cater to a large number of customers. The VNAs may be understood as the different virtual machines having its own processor(s) running its own operating system, and other software applications independently of each other. For instance, a service provider hosting a cloud computing network for providing virtual firewalls may host various VNAs with each VNA acting as an independent firewall for a particular set of users. The users may thus interact with any of the VNAs providing a similar service for availing the particular service. For the purpose, the conventional cloud computing networks include a load balancer to divert flow of data packets from the user to the VNAs based on various factors, such as load, i.e., number of flows handled by each of the VNA.

Typically, upon receiving a new flow of data packets, hereinafter referred to as flow, the load balancer may determine the load handled by each of the VNAs and direct the flow to the VNA having least load. In case all the VNAs are heavily loaded, the load balancer may launch a new VNA and map the flow to the new VNA, thus managing the load in the cloud computing network. Although launching the new VNA may facilitate the load balancer in directing the newly received flows, the load balancer still may not be able to reduce the load on the existing VNAs as flows, once mapped to a VNA, have to be typically managed and processed by the same VNA. The new VNA may thus be able to handle only the new flows and may thus not be launched for very few flows as each VNA may result in additional costs for the service provider. The load balancer may thus launch the new VNAs only when it either receives lot of new flows or when the existing VNAs are very heavily loaded, thus affecting the efficiency of the existing VNAs due to the limited resources, such as processor capabilities and memory space.

Further, in order to manage resource utilization and for reducing the associated costs, the conventional load balancers may reduce the number of VNAs whenever the load reduces. For the purpose, the load balancers may remove the VNAs handling least number of flows. However, as a VNA may be removed after all the flows managed by the VNA are processed, the load balancer may not be able to remove the VNAs immediately, thus resulting in resource and wastage. Removing a VNA may be difficult especially in services that involve long continuous flows, for instance, in cases of VPN connections. Furthermore, in case any VNA fails, i.e., stops functioning, the flow managed by the VNA may get disrupted, thus affecting quality of the service offered by the service provider and received by the customer. The load balancer may thus either wait for the VNA to restart functioning or map the flow to another VNA for restarting the flow processing from the beginning, thus affecting customer's experience, especially when the failed VNA had been processing the flow for a long time.

According to an implementation of the present subject matter, systems and methods for flow migration between virtual network appliances in a cloud computing network are described. The systems and the methods can be implemented by a variety of computing devices hosting virtual machines, such as a desktop computer, cloud servers, mainframe computers, workstation, a multiprocessor system, a network computer, and a server. Further, the systems and methods may be implemented in cloud computing networks hosting variety of services, such as firewalls, data storage, WAN optimization, VPN, intrusion detection, and data storage.

In accordance with an embodiment of the present subject matter, a network appliances managing architecture for migrating flow between the VNAs in the cloud computing network is described. In said embodiment, the network appliances managing architecture may manage the flow between various VNAs such that flow from a first VNA can be migrated to a second VNA in case the first VNA becomes overloaded, under-loaded, or fails to operate. Migrating the flow allows the cloud computing network to efficiently manage and process the flows without disrupting processing of the flow and in a cost effective way. The network appliances managing architecture includes a controller, a classifier, the VNAs, and global state database.

In one implementation, the classifier may map flows to the VNAs based on one or more predetermined mapping policy. On receiving first packets of any new flow, the controller may identify the VNA based on the mapping policy and instruct the VNA to manage and process the flow. On receiving the instructions from the classifier, the VNA may start receiving the data packets and initiate the processing of the flow. Further, the VNA may include an agent for maintaining a local state of all the flows being processed by the VNA in order to indicate the progress of the flow processing. In one implementation, the agent may update the local state of the flow to the global state database for maintaining a progress report of all the flows being processed in the cloud computing network. Maintaining such a report allows easy and efficient migration of the flows between the VNA as a new VNA may easily access the global state database to obtain the state of the flow processing and continue processing the flow without affecting the processing of the flow.

Further, the agent may monitor resource utilization of the VNA and regularly provide performance data indicating the resource utilization to the controller. The controller, on receiving the performance data, may analyze the performance data to determine if the VNA has a weak performance status, i.e., if the VNA is under-loaded, overloaded, or has failed. In case the VNA is ascertained to have the weak performance status, the controller may indicate the classifier to migrate the flows handled by the VNA to another VNA. The controller may simultaneously also request the VNA to update its local state to the global state database. The classifier may subsequently identify one or more active VNAs, i.e., VNAs that are operational and are not overloaded and map the flows to one or more than one VNA. In one implementation, the controller may also launch a new VNA in case the existing VNAs may not be able to handle the load, for instance, in case of failure or overloading of one or more VNAs. The classifier, in such a case, may identify the new VNA as the active VNA for flow migration. The active VNA may subsequently access the global state database to obtain global state of the migrated flow and start processing the flow.

Further, in one embodiment, the controller may facilitate fast scaling up and scaling down of the VNAs in the cloud computing network in order to manage the resource utilization of cloud computing network. For the purpose, the controller may analyze the performance data of all the VNAs and determine the VNAs for which the flows may be migrated to another VNA for efficient management and subsequently instruct the classifier to migrate the flow from the VNA to the other VNA.

The present subject matter thus facilitates efficient and immediate migration of flows between various VNAs in a cloud computing network. Providing the agents in the VNA for continuously monitoring the local state of the VNA's flow processing and periodically update the global state database about global state of the VNA helps in keeping a track of the progress of the flows being processed by the VNA. Thus, after flow migration, the new VNA may easily continue processing of the flow from the same point at which the flow was migrated from the earlier VNA. Further, enabling the controller to identify the VNAs whose flows need to be migrated facilitates in ensuring smooth and efficient functioning of the cloud computing network as all flows are continuously processed without any interruption even when any VNA fails.

It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the words "connected" and "coupled" are used throughout for clarity of the description and can include either a direct connection or an indirect connection.

Figure 2:
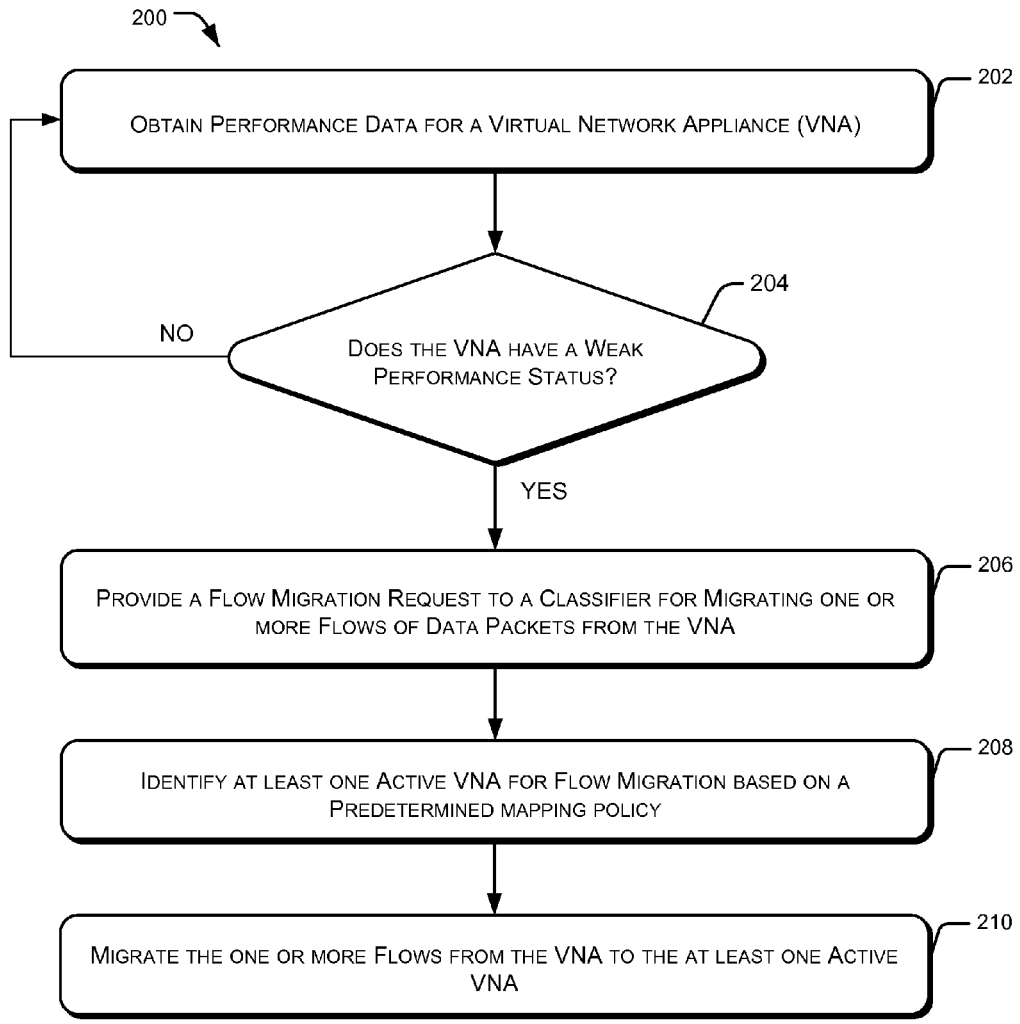
FIG. 2 illustrates a method for flow migration between virtual network appliances in a cloud computing network, according to an embodiment of the present subject matter.
Figure 3:
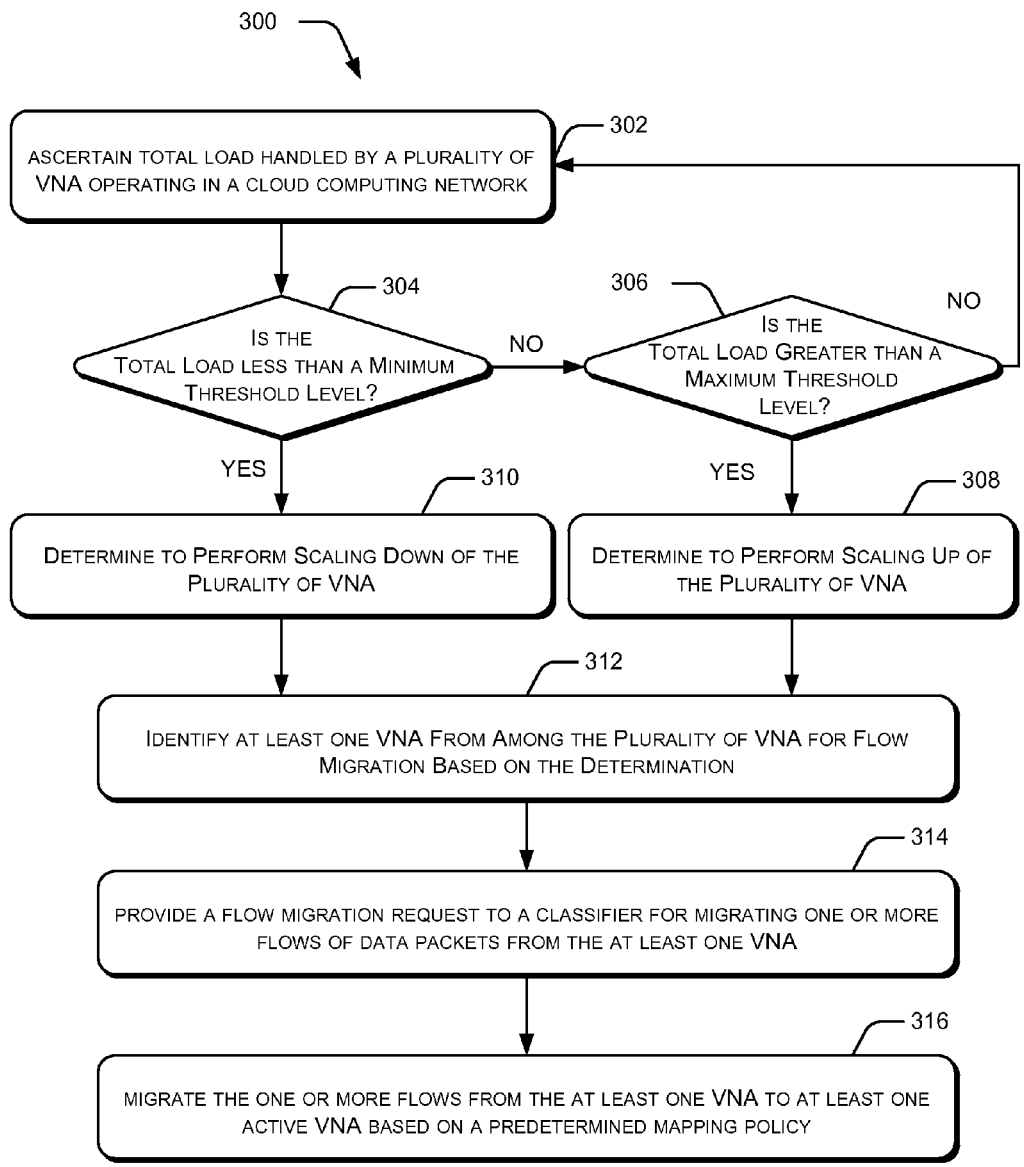
FIG. 3 illustrates a method for managing virtual network appliances, according to an embodiment of the present subject matter.

The manner in which the systems and the methods of migrating flow between virtual network appliances in the cloud computing network may be implemented has been explained in details with respect to the FIGS. 1 to 3. While aspects of described systems and methods for managing virtual network appliances in the cloud computing network can be implemented in any number of different computing systems and transmission environments, the embodiments are described in the context of the following system(s).

FIG. 1 illustrates a cloud computing environment 100 according to an embodiment of the present subject matter. The cloud computing environment 100 includes one or more user devices 102-1, 102-2, 102-3, . . . , 102-n, hereinafter collectively referred to as user devices 102 and individually referred to as user device 102, communicating with a cloud computing network 104 for accessing one or more services offered by a host of the cloud computing network 104. In one implementation, the user device 102 may communicate with the cloud computing network 104 over one or more communication links.

In one implementation, the cloud computing network may provide a variety of services, such as firewalls, data storage, WAN optimization, VPN, intrusion detection, and data storage. A service provider hosting the cloud computing network 104, hereinafter referred to as cloud 104, may install one or more of a variety of computing devices (not shown in the figure), such as a desktop computer, cloud servers, mainframe computers, workstation, a multiprocessor system, a network computer, and a server for hosting one or more virtual machines for offering the variety of services to the user device 102. In one implementation, the computing devices may host individual virtual machines for each of the services hosted by the cloud 104. Further, in order to serve a large number of the user devices 102, the computing devices may host one or more virtual network appliances (VNAs) 106-1, 106-2, . . . , 106-N, hereinafter referred to as VNAs 106 of the same network appliance in the cloud 104. Each of the VNAs 106 may thus be understood as a self-contained platform having its own processers and memory spaces for running its own operating system and software applications.

For instance, in case of a cloud providing firewall services, the cloud 104 may include one or more VNAs 106 for providing firewall services to the user devices 102 such that each of the VNAs 106 serve one or more of the user devices 102. In order to avail the services offered by the cloud 104, each of the user devices 102 may exchange data packets with the cloud 104. On receiving the data packets, the VNAs 106 may process the data packets for providing the services to the user devices 102. In one implementation, the cloud 104 may monitor the distribution of flows of data packets among the VNAs 106 such that one or more flows handled by a VNA 106 may be efficiently and immediately migrated to another VNAs 106 as and when desired for managing the load handled by the VNAs 106.

For the purpose, the cloud 104 may implement a network appliances managing architecture 108 comprising a flow distribution system 110, the VNAs 106, and global state database 112. The network appliances managing architecture 108 may facilitate the cloud 104 in the efficient migration of the flows among the VNAs 106. In one implementation, the flow distribution system 110 may be a virtual machine to distribute the flow received from the user devices 102 among the VNAs 106. The flow distribution system 110 may further include a classifier 114 to distribute the flows among the VNAs 106 and a controller 116 to manage migration of the flows among the VNAs 106. Although the flow distribution system 110 has been shown as a single system residing on a single virtual machine, it may be implemented as a distributed system with the controller 116 and the classifier 114 residing as separate virtual machines. Further, the controller 116 and classifier 114 may, individually or collectively, reside on any of the VNAs 106.

The global state database 112 is provided to maintain a global state of the VNAs 106. The global state of a VNA may be understood as data indicating progress of processing of all the flows handled by the VNA. In one implementation, the global state may further include rules applicable for processing the flows handled by the VNAs. The global state database 112 may thus interact with the VNAs 106 over a data channel for exchanging the global state data. Further, the global state database 112 may be maintained using known techniques, such as distributed hash tables. Although the global state database 112 has been shown as a single database residing on a single virtual machine, it may be implemented as a distributed database residing on separate virtual machines, such as the VNAs 106.

During operation, a user of the user devices 102 intending to avail the services provided by the cloud 104 may initially access a web based link provided by the service provider to establish a communication channel with the cloud 104 using a communication link, such as Internet. Once connected, the cloud 104 may start receiving data packets from the user device 102 over the communication channel. In one implementation, the user devices 102 may use known TCP-IP protocols for interacting with the cloud 104 by transmitting data packets defined by TCP flows. In one implementation, the data packets of every new flow coming to the cloud 104 may be initially received by the classifier 114. On receiving the data packets, the classifier 114 may identify a VNA 106 from among the VNAs 106 for handling the new flow based on one or more predetermined mapping policies, such as round-robin policy; policies based on load, such as memory and processor utilization; policies based on flow type, such as http and ftp; and policies based on source and destination address of the flow.

Upon identification, the classifier 114 may send a set of flow mapping instructions to the identified VNA 106 for initiating handling of the new flow of data packets. On receiving the instructions from the classifier 114, the VNA 106 may start receiving the data packets and initiate the processing of the flow. For instance, in an example of the cloud 104 providing WAN optimization service the VNAs 106, implemented as WAN optimizers, may perform fingerprint or SHA-hash computation of the data packets for redundancy elimination functionality. In another example of the cloud 104 providing hosting the VNAs 106 as VPN servers, the VNAs 106 may process the data packets for performing encryption to ensure secure transmission of the data packets. Further, the VNA 106 may interact with the global state database 112 to obtain the global state having the rules for processing the flow.

For the purpose, each of the VNAs 106 may include an agent 118-1, . . . , 118-n, hereinafter collectively referred to as the agents 118 and individually referred to as the agent 118, to obtain the global state from the global state database 112 based on which the VNA 106 may process the data packets of the flow. Further, the agent 118 may maintain a local state of all the flows being processed by the VNA 106. The local state may be understood as data, such as number of data packets received and processed by the VNA 106 thus indicating progress of processing of the flow. In one implementation, the agents 118 may save the local state in the local state data 120-1, . . . , 120-n, hereinafter collectively referred to as the local state data 120 and individually referred to as the local state data 120. The agent 118 may thus continuously monitor the progress of the flow and update the local state data 120 about the local state.

The agent 118 may further update the local state of the flow to the global state database 112 on periodic bases, for instance, upon processing of a predetermined number of data packets or on regular intervals of time. In one implementation, upon each of such updates, the agent 118 may reset the local state to Null and restart the monitoring of the local state so that local state data 120 may only store the local state between two updates thus utilizing very less amount of memory space. In another implementation, the agent 118 may continue monitoring of the local state from the state at the time of the update.

In one implementation, the agent 118 may maintain performance data for the VNA 106, where the performance data may include values performance parameters of the VNA 106. Examples of the performance parameters include, but are not limited to, processor utilization, memory utilization, and number of flows handled by the VNA 106. The performance parameters may thus indicate the capabilities of the VNA 106, i.e., the amount of load currently handled by the VNA 106 and the amount of load it can handle. The agent 118 may thus regularly monitor the performance parameter in order to monitor the health status of the VNA 106 and provide the performance data to the controller 116. In one embodiment, the agent 118 may provide the performance data upon receiving a request from the controller 116.

On receiving the performance data, the controller 116 may analyze the performance data to determine the performance status of the VNA 106. In one implementation, the controller 116 may analyze the performance parameters to classify the VNA 106 as having a performance status from one of under-loaded, overloaded, failed, and balanced loaded. The under-loaded performance status may indicate that the load, i.e., number of data packets handled by the VNA 106 is less than a predetermined threshold of minimum load, indicating that the VNA 106 is underperforming and can thus be either removed or provided more load. The overloaded status may indicate that the number of data packets handled by the VNA 106 is more than a predetermined threshold of maximum load indicating that the VNA 106 is handling more load than its capability and thus needs to be offloaded. The balanced loaded status may indicate that the number of data packets handled by the VNA 106 is between the predetermined threshold of minimum load and the predetermined threshold of maximum load. The failed status may indicate that the VNA 106 has malfunctioned and thus cannot handle the flows mapped to the VNA 106. In case the controller 116 determines the VNA 106 to have a weak performance status, i.e., if the VNA 106 is under-loaded, overloaded, or has failed, the controller 116 may identify the VNA 106 as a weak VNA 106. The controller 116 may subsequently provide a flow migration request to the classifier 114 for migrating one or more flows of the weak VNA 106 to another VNA 106. The controller 116 may simultaneously also instruct the weak VNA 106 to update its local state to the global state database 112. In one implementation, the controller 116 may send the flow migration request to the classifier 114 and the instructions to the VNA 106 over a control channel. In one embodiment, in case the controller 116 determines that the existing VNAs 106 may not be able to handle the flows being migrated from weak VNA 106, the controller 116 may also launch a new VNA and inform the classifier 114 accordingly. For instance, in case of failure or overloading of one or more VNAs 106, the controller 116 may determine that the existing VNAs 106 may not be able to handle the migrated flows and may thus launch a new VNA. In another embodiment, the controller 116 may launch a new VNA whenever an existing VNA 106 fails.

For example, in case where each of the VNAs 106 is capable of handling 100 data packets per second, and total of three VNAs 106 are active, then the maximum load that can be handled by the cloud will be 300 data packets per second. Let's assume each of the three VNAs 106 is handling flows having 75 data packets per second in total and one of the VNA 106 fails. In such a case the controller 116 may determine that the flows of the weak VNA 106 may not be handled by the other two VNAs 106 and may thus launch a new VNA. The controller 116 may then send the flow migration request to the classifier 114 and also inform the classifier 116 about the launching of the new VNA.

On receiving the flow migration request the classifier 114 may identify at least one active VNA, e.g., a VNA 106 that is operational and is not overloaded and may thus be able to handle one or more flows migrated from the weak VNA 106. In one implementation, the classifier 114 may identify the VNA 106 based on one or more predetermined factors, such as the performance status and the number of flows or data packets handled by the weak VNA 106 and the other VNAs 106 currently operational in the cloud 104. For the purpose, the classifier 114 may analyze the flow migration request to determine the number of flows and data packets handled by the weak VNA 106 and whether the weak VNA 106 is under-loaded, overloaded, or failed. In case the VNA 106 is under-loaded, the classifier 114 may ascertain that the controller 116 would not have launched any new VNA 106. The classifier 114 may thus identify at least one VNA 106 from the plurality of the VNAs 106, having the performance status as either under-loaded or balanced loaded as the active VNA 106.

In case the VNA 106 is either over-loaded or failed, the classifier 114 would ascertain that the controller 116 may have launched a new VNA. In case the new VNA has been launched, the classifier 114 may identify the new VNA as the active VNA 106, otherwise, the classifier 114 may identify at least on VNA 106, from the plurality of the VNAs 106, having the performance status as either under-loaded or balanced loaded as the active VNA 106. Further, based on the number of flows to be migrated, the classifier 114 may determine the number of active VNAs 106 to whom the flow needs to be migrated.

Upon identifying the new VNA 106, the classifier 114 may migrate the flows from the weak VNA 106 to the at least one active VNA 106 by mapping the flows to the at least one active VNA 106. Further, in case the weak VNA 106 is under-loaded, the classifier 114 may remove the weak VNA 106 upon flow migration. The classifier 114 may subsequently send flow mapping instructions to the active VNA 106 instructing the active VNA 106 to start processing the migrated flows. On receiving the flow mapping instructions, the agent 118 of the active VNA 106 may subsequently access the global state database 112 to obtain the global state of the migrated flow and store in the local state data 120. Based on the global state, the active VNA 106 may determine the rules for processing the flow and processing status of the migrated flow and subsequently start processing the flow without affecting the flow process. Storing the global state in the global state database 112 thus facilitates the active VNA 106 in efficiently processing the flow from the same point where the weak VNA 106 had stopped processing the flow, thus saving substantial resources. Further, saving the global state in the global state database 112 also allows a quick and immediate migration of the flow without affecting the user's experience. Furthermore, regular monitoring of the performance data by the agent 118 and the controller 116 facilitates timely identification of the weak VNAs 106, thus ensuring smooth and continuous operation of the cloud.

Further, in one embodiment, the flow distribution system 110 may facilitate scaling up and scaling down of the VNAs 106 in the cloud 104. Scaling up of the VNAs 106 may be understood as the process of increasing the number of VNAs 106 present in the cloud 104 in order to either handle an increase or a potential increase in the traffic, i.e., the number of flows or data packets handled by the cloud 104 or reduce load on an existing overloaded VNA 106. Scaling down of the VNAs 106 may be understood as the process of the reducing the number of VNAs 106 present in the cloud 104 in order to reduce the resources utilized by the cloud in case the load currently handled by the cloud 104 can be still be handled by the VNAs 106 remaining after removal of one VNA 106. Thus, scaling up or scaling down the VNAs 106 may facilitate the network appliances managing architecture 108 in efficiently managing the resource utilization of the cloud 104.

In one implementation, the controller 116 may initially ascertain total load, e.g., the total number of data packets or flows handled by the VNAs 106. For instance, the controller 116 may identify the load individually handled by each of the VNA 106 and add the load to determine the total load handled by all the VNAs 106 together. The controller 116 may subsequently compare the total load with a minimum threshold level and a maximum threshold level of load that can be handled by the VNAs 106. The minimum threshold level defines the minimum load that a particular number of VNAs 106 should handle in order to achieve efficient resource utilization in the cloud 104. The maximum threshold level defines the maximum load that a particular number of VNAs 106 may handle in order to achieve efficient flow processing with adequate resource utilization in the cloud 104.

Based on the comparison, the controller 116 may determine whether either of the scaling up or scaling down has to be performed. In case the controller 116 determines to scale down the VNAs 106, the controller 116 may obtain the performance data of all the VNAs 106 to ascertain the VNA 106 that may be removed after migrating its flows to other VNAs 106. The controller 116 may then determine the performance status of all the VNAs 106 to identify the VNA 106 having a weakest performance status as the VNA 106 that may be removed. In one implementation, the performance status of each VNA 106 may be analyzed based on the number of flows handled by the VNA 106 and the resources, such as processor and memory space utilized by the VNA 106. The controller 116 may subsequently send the flow migration request to the classifier 114 for migrating the flows of a weak VNA 106 thus identified. The classifier 114 in turn may migrate the flows of the weak VNA 106 to other VNAs 106 based on the predetermined mapping policy and then remove the weak VNA 106.

In case the controller 116 decides to scale up the VNAs 106, the controller 116 may launch a new VNA to which the load of one or more existing flows may be migrated, in order to balance load on all the VNAs 106. The controller 116 may then obtain the performance data of all the VNAs 106 to ascertain at least one VNA 106 whose flows may be migrated to the other VNAs 106. For the purpose, the controller 116 may initially determine an aggregate load of the cloud 104 by dividing the total load by the number of VNAs 106 present in the cloud 104. The controller 116 may then identify the VNAs 106 handling load greater than the aggregate load and send the flow migration request to the classifier 114 for migrating the flows of the VNA 106 thus identified. The classifier 114 in turn may migrate the flows of the identified VNA 106 to other VNAs 106 based on the predetermined mapping policy such that all the VNA 106 present in the cloud 104 handle load less than or equal to the aggregate load of the cloud 104. The flow distribution system 110 may thus efficiently manage the VNAs 106 and the flows handled by the VNAs 106 in the cloud 104.

Although the performance of scaling up and scaling down the VNAs 106 has been described with reference to an automatic monitoring of the VNAs 106 by the controller, it will be understood by a person skilled in the art that scaling up or scaling down may be performed upon receiving instructions from a service provider of the cloud 104.

Further, in on implementation, the controller 116 and the classifier 114 may also include agents similar to the agent 118 in order to monitor the controller 116 and the classifier 114, respectively. Furthermore, in case the classifier 114 fails during the operation of the cloud 104, the controller 116 may request the VNAs 106 to provide a list of the flows handled by them. Based on the lists obtained from each of the VNAs 106, the controller 116 may reconstruct the mapping for each of the VNAs 106 and provide details of the mappings to a new virtual machine assigned to operate as the classifier 114. The network appliances managing architecture 108 thus facilitates in avoiding all possible failures of the cloud 104.

FIGS. 2 and 3 illustrate a method 200 and a method 300, respectively, for managing virtual network appliances in a cloud computing networking, according to an embodiment of the present subject matter. The order in which the method is described is not intended to be construed as a limitation, and any number of the described method blocks can be combined in any order to implement the methods 200 and 300 or any alternative methods. Additionally, individual blocks may be deleted from the methods without departing from the spirit and scope of the subject matter described herein. Furthermore, the method(s) can be implemented in any suitable hardware, software, firmware, or combination thereof.

The method(s) may be described in the general context of computer executable instructions. Generally, computer executable instructions can include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the method(s) 200 and 300 can be performed by programmed computers. Herein, some embodiments are also intended to cover program storage devices or computer readable medium, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication devices to perform said steps of the method(s).

FIG. 2 illustrates the method 200 for flow migration between virtual network appliances (VNAs) in a cloud computing network, according to an embodiment of the present subject matter.

At block 202, performance data for a VNA is obtained. In one implementation, the performance data for a VNA 106 provided in a cloud computing network, say, the cloud 104 may be obtained by a controller, say, the controller 116. The performance data may include values of one or more performance parameters, such as processor utilization, memory utilization, and number of flows handled by the VNA. In one embodiment, the performance data may be received as a part of a periodical update from the VNA. In another embodiment, the performance data may be received upon a request from the controller.

At block 204, a determination is made to ascertain whether the VNA has a weak performance status or not. In one implementation, the performance data may be analyzed by the controller to determine the performance status of the VNA. If the controller determines the performance status to be a balanced loaded status, the controller may determine the VNA as not having the weak performance status, which is the 'No' path from the block 204, the method moves back to the block 202, where the performance data may be further received, for example, after a predetermined time period.

In case at block 204 it is determined that the VNA has the weak performance status, i.e., the VNA has any one of an under-loaded, overloaded, and failed status, which is the 'Yes' path from the block 204, a flow migration request for migrating one or more flows of data packets from is provided to a classifier, say, the classifier 114 at block 206. For example, on determining the VNA to have a weak performance status the controller may decide to remove the VNA in order to manage resource utilization in the cloud 104. The controller may thus send the flow migration request to the classifier asking the classifier to migrate the flows of the VNA to another VNA. Further, in case the performance status of the VNA is either of the overloaded or the failed status, the controller may launch a new VNA to which the classifier may migrate one or more of the flows of the VNA.

At block 208, at least one active VNA is identified for flow migration based on a predetermined mapping policy. In one implementation, upon receiving the flow migration request from the controller, the classifier may identify the at least one active VNA, from among a plurality of VNAs, having the performance status corresponding to one of the under-loaded and balanced loaded status. In another implementation, the classifier may identify the new VNA as the active VNA in case the controller indicates the launching of the new VNA in the flow migration request. Further, the classifier may determine the at least one active VNA based on the predetermined policies, such as round robin policy.

At block 210, one or more flows from the VNA are migrated to the at least one active VNA. Upon identifying the at least one active VNA, the classifier may send flow mapping instructions to the at least one active VNA indicating the migration of the one or more flows from the VNA. Upon receiving the flow mapping instructions, the at least one active VNA may obtain global state of the flows and start processing of the flows. Further, in case the performance status of the VNA whose flows are migrated was under-loaded, then the classifier may remove the VNA upon migrating the flow to the at least one active VNA.

FIG. 3 illustrates the method 300 for managing virtual network appliances, according to an embodiment of the present subject matter At block 302, total load handled by a plurality of VNA operating in a cloud computing network is ascertained. In one implementation, the total load handled by each of the plurality of VNA may be obtained and a sum of the load handled by the VNAs. VNA may be ascertained to obtain the total load handled by the plurality of VNA in the cloud computing network, for example, the cloud 104.

At block 304, a determination is made to ascertain whether the total load is less than a minimum threshold level. For instance, the total load is compared with the minimum threshold level. If the controller 116 determines that the total load is greater than the minimum threshold level which is the 'No' path from the block 304, a determination is made at block 306 to ascertain whether the total load is greater than a maximum threshold level. For instance, the total load is compared with the maximum threshold level. If the controller 116 determines that the total load is less than the maximum threshold level which is the 'No' path from the block 306, the method moves back to the block 302, where the total load may be re-ascertained, for example, after a predetermined time period.

In case at block 306 it is determined that the total load is greater than the maximum threshold level, which is the 'Yes' path from the block 306, it is determined to perform scaling up of the plurality of VNA at block 308.

In case at block 304 it is determined that the total load is less than the minimum threshold level, which is the 'Yes' path from the block 304, it is determined to perform scaling down of the plurality of VNA at block 310.

On determining to perform either of scaling up or scaling down at the block 308 and 310, respectively, the method moves at block 312. At the block 312, at least one VNA is identified from among the plurality of VNA for flow migration based on the determination. In one implementation, upon determining to perform scaling up, at least one VNA may be ascertained that is handling load greater than an aggregate load of the plurality of VNA and identified as the at least one VNA for flow migration. In another implementation, upon determining to perform scaling down, at least one VNA may be ascertained that is having the weakest performance status among the plurality of VNA and thus identified as the at least one VNA for flow migration, a new VNA may be launched Alternatively, as discussed in method 200, the controller may decide to migrate flows from one VNA to another VNA upon determining the VNA to have weak performance status.

At block 314, a flow migration request for migrating one or more flows of data packets from the at least one VNA is provided to a classifier. For example, on determining to perform scaling down, the controller may decide to remove the at least one VNA in order to manage resource utilization in the cloud 104. The controller may thus send the flow migration request to the classifier asking the classifier to migrate the flows of the at least one VNA to another VNA. Further, on determining to perform scaling up, the controller may decide to reduce load of the at least VNA and launch a new VNA. The controller may thus send the flow migration request to the classifier asking the classifier to migrate the flows of the at least one VNA to the new VNA.

At block 316, the one or more flows from the at least one VNA are migrated to at least one active VNA. Upon identifying the at least one active VNA, the classifier may send flow mapping instructions to the at least one active VNA indicating the migration of the one or more flows from the at least one VNA. Upon receiving the flow mapping instructions, the at least one active VNA may obtain global state of the flows and start processing the flows. Further, in case of scaling down, the classifier may remove the at least one VNA upon migrating the flow to the at least one active VNA.

Although primarily depicted and described in a particular sequence, it should be appreciated that the steps shown in methods 200 and 300 may be performed in any suitable sequence. Moreover, the steps identified by one step may also be performed in one or more other steps in the sequence or common actions of more than one step may be performed only once. For example, step 306 may be performed before step 304 or steps 304 and 306 may be performed at the same time and an indicator may determine whether the method continues to step 302, 308 or 310.

Although embodiments for flow migration between virtual network appliances in the cloud computing network have been described in a language specific to structural features or method(s), it is to be understood that the invention is not necessarily limited to the specific features or method(s) described. Rather, the specific features and methods are disclosed as embodiments for flow migration between virtual network appliances in the cloud computing network.

What is claimed is:

1. A network appliances managing apparatus for migrating flow between a plurality of virtual network appliances (VNAs) in a cloud computing network, the network appliances managing apparatus comprising: a non-transitory computer readable medium including computer readable instructions; and
   one or more processors configured to execute the computer readable instructions to:
   obtain performance data for each of the plurality of VNAs;
   analyze the performance data to determine whether a first VNA of the plurality of VNAs has a weak performance status, where the weak performance status corresponds to any one of an overloaded, an under-loaded, and a faded status;
   receive a flow migration request for migrating one or more flows of data packets from the first VNA based on the analyzing;
   identify an active VNA to receive the flow migration based on a mapping policy;
   reconstruct mapping for the active VNA, the reconstructing being based on the performance data obtained from each of the plurality of VNAs;
   migrate with the reconstructed mapping for the active VNA, the one or more flows from the first VNA to the active VNA;
   provide to the active VNA a global state for the migrated flow from global state database; and
   update from an agent in the active VNA, periodically, a local state of the migrated flow to the global state database.

2. The network appliances managing apparatus as claimed in claim 1, wherein the active VNA further:
   provide to the active VNA flow mapping instructions for initiating handling of the migrated flow of data packets;
   provide to the active VNA a global state for the migrated flow from global state database; and
   cause the active VNA to handle migrated flow for processing the data packets based on the global state.

3. The network appliances managing apparatus as claimed in claim 2, wherein the active VNA comprises an agent to:

obtain the global state for the migrated flow from the global state database; and periodically update a local state of the migrated flow to the global state database.

4. The network appliances managing apparatus as claimed in claim 1, further comprising a plurality of VNAs, wherein each of the plurality of VNAs includes a corresponding agent to:

monitor performance parameters of the corresponding VNA; and provide the performance data to the one or more processors based on the monitoring.

5. The network appliances managing apparatus as claimed in claim 1, wherein the one or more processors is further configured to launch a new VNA for the performance status of the VNA corresponding to one of the overloaded and the failed status.

6. The network appliances managing apparatus as claimed in claim 1, wherein the one or more processors is further configured to determine at least one VNA, from among a plurality of VNA, having the performance status corresponding to one of the under-loaded and a balanced loaded status as the at least one active VNA; and remove the VNA upon flow migration to the at least one active VNA.

7. A method for flow migration between a plurality of virtual network appliances (VNAs) in a cloud computing network, the method comprising:

obtaining performance data for each of the plurality of VNAs;

analyzing the performance data to determine whether the first VNA has a weak performance status, where the weak performance status corresponds to any one of an overloaded, an under-loaded, and a failed status;

providing a flow migration request to a classifier for migrating one or more flows of data packets from a first VNA of a plurality of VNAs based on the analyzing;

identifying at least one active VNA to receive the flow migration based on a mapping policy;

reconstructing mapping for the active VNA, the reconstructing being based on the performance data obtained from each of the plurality of VNAs;

migrating, with the reconstructed mapping for the active VNA, the one or more flows from the first VNA to the at least one active VNA;

providing to the active VNA a global state for the migrated flow from global state database; and updating from an agent in the active VNA, periodically, a local state of the migrated flow to the global state database.

8. The method as claimed in claim 7, further comprising:

launching a new VNA for the performance status of the VNA corresponding to one of the overloaded and the failed status.

9. The method as claimed in claim 8, wherein the identifying further comprises determining the new VNA as the at least one active VNA for flow migration.

10. The method as claimed in claim 7, wherein the identifying, for the performance status corresponding to one of the overloaded and the failed status, includes determining at least one VNA, from among a plurality of VNAs, having the performance status corresponding to one of the under-loaded and a balanced loaded status as the at least one active VNA.

11. The method as claimed in claim 7, further comprising:

removing the first VNA upon flow migration to the at least one active VNA for the performance status corresponding to the under-loaded status.

12. The method as claimed in claim 7, wherein the method further comprises obtaining, by the at least one active VNA, global state corresponding to the migrated flow from global state database to initiate processing of the data packets corresponding the migrated flow.

13. A method for managing virtual network appliances (VNAs) comprising:

ascertaining total load handled by a plurality of VNAs operating in a cloud computing network, the total load being based on a load handled by each of the plurality of VNAs:

comparing the total load with a minimum threshold level and a maximum threshold level;

determining whether to perform at least one of a scaling up or a scaling down of the plurality of VNAs based on the comparing;

identifying at least one first VNA from among the plurality of VNAs for flow migration based on the determination;

providing a flow migration request for migrating one or more flows of data packets from the at least one first VNA to at least one active VNA based on the identifying;

reconstructing mapping for the at least one active VNA, the reconstructing being based on the total load;

migrating, with the reconstructed mapping for the at least one active VNA, the one or more flows from the at least one first VNA to the at least one active VNA based on a mapping policy;

providing to the active VNA a global state for the migrated flow from global state database; and updating from an agent in the active VNA, periodically, a local state of the migrated flow to the global state database.

14. The method as claimed in claim 13, wherein the determining, for performing scaling down, includes obtaining performance data for each of the plurality of VNAs;

analyzing the performance data to determine a performance status of each of the plurality of VNAs; and identifying a VNA having a weakest performance status as the at least one VNA, wherein the performance data indicates a value of at least one performance parameter of a corresponding VNA, and wherein the at least one performance parameter includes processor utilization, memory utilization, and number of flows handled.

15. A non-transitory computer-readable medium including computer executable instructions that, when executed by one or more processors cause the one or more processors to perform operations including:

Receiving performance data for a first virtual network appliance (VNA), the performance data being based on load handled by each of a plurality of VNAs:

analyzing the performance data to determine whether the first VNA has a weak performance status, where the weak performance status corresponds to any one of an overloaded, an under-loaded, and a faded status;

providing a flow migration request for migrating one or more flows of data packets from the first VNA based on the analyzing;

identifying at least one active VNA for flow migration based on a predetermined mapping policy reconstructing mapping for the active VNA, the reconstructing being based on a total of the loads handled by each of the plurality of VNAs;

migrating, with the reconstructed mapping for the active VNA, the one or more flows from the first VNA to the at least one active VNA;

providing to the active VNA a global state for the migrated flow from global state database; and updating from an agent in the active VNA, periodically, a local state of the migrated flow to the global state database.

\* \* \* \* \*